US007679527B2

(12) United States Patent
Chemali

(10) Patent No.: US 7,679,527 B2
(45) Date of Patent: Mar. 16, 2010

(54) METHOD AND APPARATUS FOR AUTOMATED PARKING ASSISTANCE

(76) Inventor: Roland Edward Chemali, 20918 Golden King's Ct., Kingwood, TX (US) 77346

(*) Notice: Subject to any disclaimer, the term of this patent is extended or adjusted under 35 U.S.C. 154(b) by 268 days.

(21) Appl. No.: 11/738,910

(22) Filed: Apr. 23, 2007

(65) Prior Publication Data

US 2008/0258934 A1 Oct. 23, 2008

(51) Int. Cl.
*B60Q 1/48* (2006.01)

(52) U.S. Cl. ........................ 340/932.2; 701/1; 701/300; 180/167; 180/168; 180/169

(58) Field of Classification Search .............. 308/932.2, 308/933, 943, 436, 437; 701/300, 301, 1; 367/107, 108; 180/167–169, 199 X; 705/418
See application file for complete search history.

(56) References Cited

U.S. PATENT DOCUMENTS

| | | | | |
|---|---|---|---|---|
| 3,493,925 | A | 2/1970 | Brancale | |
| 5,285,205 | A | 2/1994 | White | |
| 5,442,348 | A * | 8/1995 | Mushell | 340/932.2 |
| 5,623,259 | A | 4/1997 | Giangardella | |
| 5,682,136 | A | 10/1997 | Del Signore | |
| 6,163,253 | A | 12/2000 | Yaron et al. | |
| 6,373,400 | B1 | 4/2002 | Fujita et al. | |
| 6,483,441 | B1 | 11/2002 | Hinde | |
| 6,531,966 | B2 | 3/2003 | Krieger | |
| 6,832,206 | B1 * | 12/2004 | Chelnik | 705/13 |
| 6,853,313 | B2 | 2/2005 | Newcomer | |
| 7,215,255 | B2 * | 5/2007 | Grush | 340/932.2 |
| 7,382,277 | B2 * | 6/2008 | Ioli Trust | 340/932.2 |
| 2003/0160705 | A1 | 8/2003 | Guetz | |
| 2003/0160717 | A1 | 8/2003 | Mattes et al. | |
| 2006/0253226 | A1 * | 11/2006 | Mendelson | 701/1 |
| 2007/0040701 | A1 * | 2/2007 | Browne et al. | 340/932.2 |

* cited by examiner

*Primary Examiner*—Davetta W Goins
*Assistant Examiner*—Edny Labbees
(74) *Attorney, Agent, or Firm*—Dillon & Yudell LLP; Andrew J. Dillon

(57) ABSTRACT

A method of automated parking assistance. A logic unit reads identification information from a transponder attached to a vehicle and determines the current position of the vehicle by measuring distances between the transponder and multiple stationary sensor devices. A pre-defined parking location is stored by pressing a single button. If the current position of the vehicle is not equal to the pre-defined parking location when the vehicle subsequently approaches, the logic unit determines one or more directions in which the current position of the vehicle must be adjusted to reduce the distance between the current position of the vehicle and the pre-defined parking location. A display device displays one or more guidance signals corresponding to the one or more directions in which the current position of the vehicle must be adjusted. If the current position of the vehicle is equal to the pre-defined parking location, a stop signal is displayed.

10 Claims, 4 Drawing Sheets

METHOD AND APPARATUS FOR AUTOMATED PARKING ASSISTANCE

BACKGROUND OF THE INVENTION

1. Technical Field

The present invention relates in general to automobiles and in particular to garages. Still more particularly, the present invention relates to an improved method and apparatus for automated parking assistance.

2. Description of the Related Art

In order to safely maneuver a vehicle within a limited area, such as a garage, a driver must simultaneously be aware of the dynamic distances between the driver's vehicle and other vehicles, walls, and/or objects. If a vehicle is parked too close to a side wall (i.e., a wall to the left or right of the vehicle) within a garage, damage may be incurred by the vehicle and/or the wall when the driver subsequently exits the vehicle. Similarly, if a vehicle is parked too close to the back wall (i.e., the wall opposite the garage door) of a garage, damage may be incurred by the vehicle and/or the garage door if the vehicle protrudes from the opening of the garage when the garage door is closed. If a first vehicle is parked too far away from a side wall within a garage, the first vehicle may obstruct the entry of a second vehicle into the garage.

Garages are typically utilized to park one or more vehicles in the same parking spaces over a period of time (e.g., a family that regularly parks the same two cars in the same spots). In such a garage, each vehicle may have different dimensions and thus occupy less space relative to other objects and/or vehicles when the vehicle is parked in a preferred pre-defined location within the garage. A driver who is distracted or unfamiliar with the garage may attempt to park the vehicle in a position other than the pre-defined location, thereby jeopardizing the vehicle, the walls of the garage, the garage door, and/or an adjacent parking space.

SUMMARY OF AN EMBODIMENT

Disclosed are a method and apparatus for automated parking assistance. A logic unit reads identification information from a transponder attached to a vehicle and determines the current position of the vehicle by measuring distances between the transponder and multiple stationary sensor devices. A pre-defined parking location is stored by pressing a single button. If the current position of the vehicle is not equal to the pre-defined parking location when the vehicle subsequently approaches, the logic unit determines one or more directions in which the current position of the vehicle must be adjusted to reduce the distance between the current position of the vehicle and the pre-defined parking location. A display device displays one or more guidance signals corresponding to the one or more directions in which the current position of the vehicle must be adjusted. If the current position of the vehicle is equal to the pre-defined parking location, a stop signal is displayed.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method and apparatus for automated parking assistance.

Figure 1:
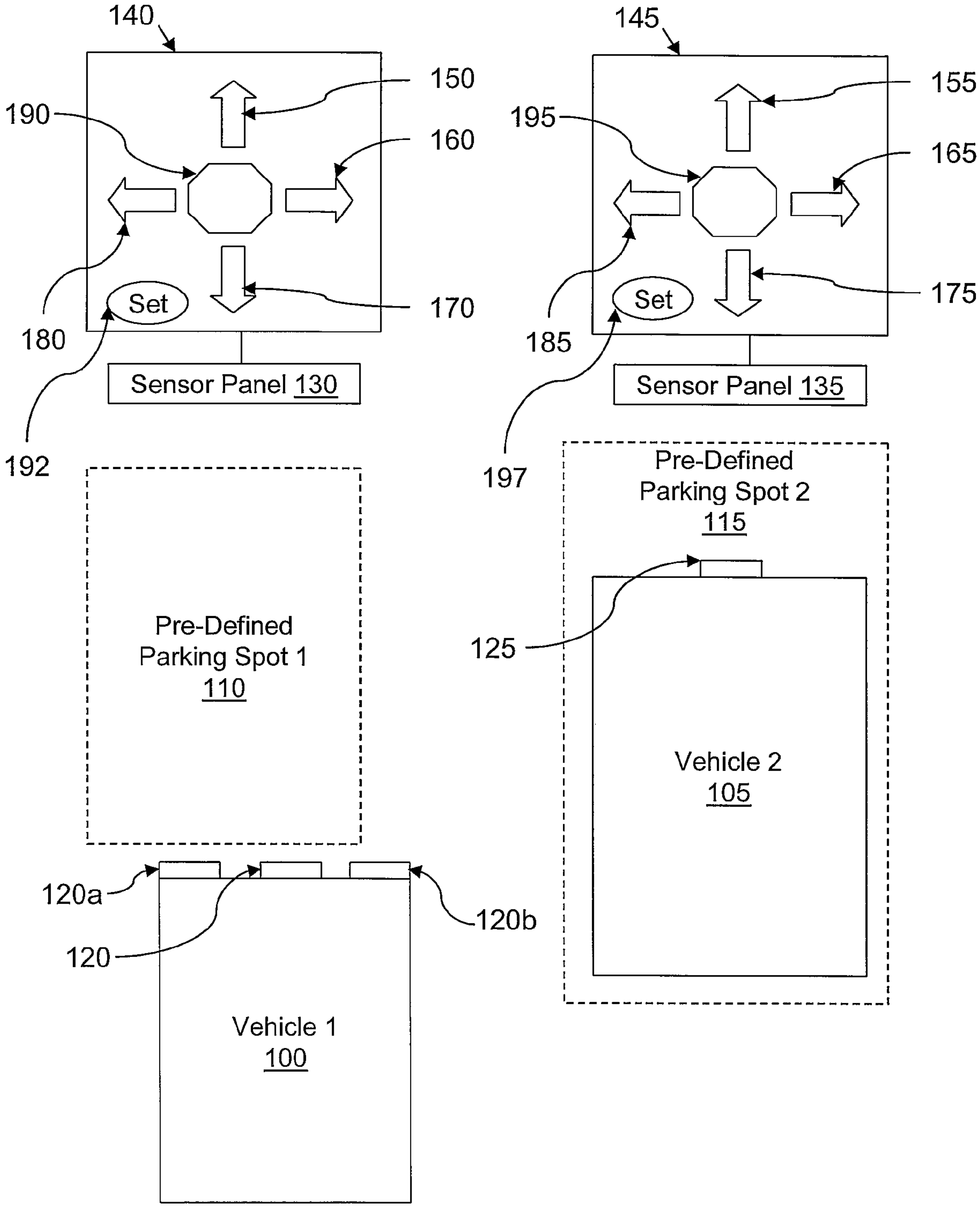
FIG. 1 depicts a high level block diagram of an automated parking assistance system, according to an embodiment of the present invention.

With reference now to FIG. 1, there is depicted a high level block diagram of an automated parking assistance system, according to an embodiment of the present invention. As shown, the automated parking assistance system includes a first sensor panel 130, a second sensor panel 135, a first display panel 140, and a second display panel 145. First sensor panel 130 enables first display panel 140 to guide a first vehicle 100 to a first pre-defined parking spot 110 using the method illustrated in FIG. 4, which is illustrated below. Similarly, second sensor panel 135 enables second display panel 145 to guide a second vehicle 105 to a second pre-defined parking spot 115. First display panel 140 includes a forward guidance signal 150, a right guidance signal 160, a reverse guidance signal 170, a left guidance signal 180, and a stop signal 190. Second display panel 145 includes a forward guidance signal 155, a right guidance signal 165, a reverse guidance signal 175, a left guidance signal 185, and a stop signal 195. In another embodiment, first display panel 140 and first sensor panel 130 may be integrated into a single panel.

According to the illustrative embodiment, first vehicle 100 and second vehicle 105 include transponders 120 and 125, respectively. Transponders 120 and 125 are easily affixed to the front of first vehicle 100 and second vehicle 105 (e.g., via a license plate bolt). In another embodiment, transponders 120 and 125 may be affixed to the rear of first vehicle 100 and second vehicle 105. In yet another embodiment, multiple transponders 120*a* and 120*b* may be affixed to first vehicle 100 and/or second vehicle 105 to enable the detection of angled or "crooked" vehicle positions. As utilized herein, a transponder generally refers to a device that receives an energy signal (e.g., ultrasonic, light, infra-red, microwave, radio frequency, or the like) and sends back a reply signal. According to the illustrative embodiment, transponders 120 and 125 are radio frequency identification (RFID) tags, which include identification information that uniquely identifies first vehicle 100 and second vehicle 105, respectively. In an alternate embodiment, transponders 120 and 125 may each include a memory, an antenna, and a battery that enables transponders 120 and 125 to be independently powered.

First display panel 140 and second display panel 145 include set buttons 192 and 197, respectively, which enable a user the automated parking assistance system to easily define the current position of a vehicle as a parking spot via the process illustrated in FIG. 3, which is discussed below. In another embodiment, set buttons 192 and 197 may instead be included on sensor panels 130 and 135, respectively. In yet another embodiment, set buttons 192 and 197 may instead be included on a remote control device (e.g., a garage door opener).

Figure 2:
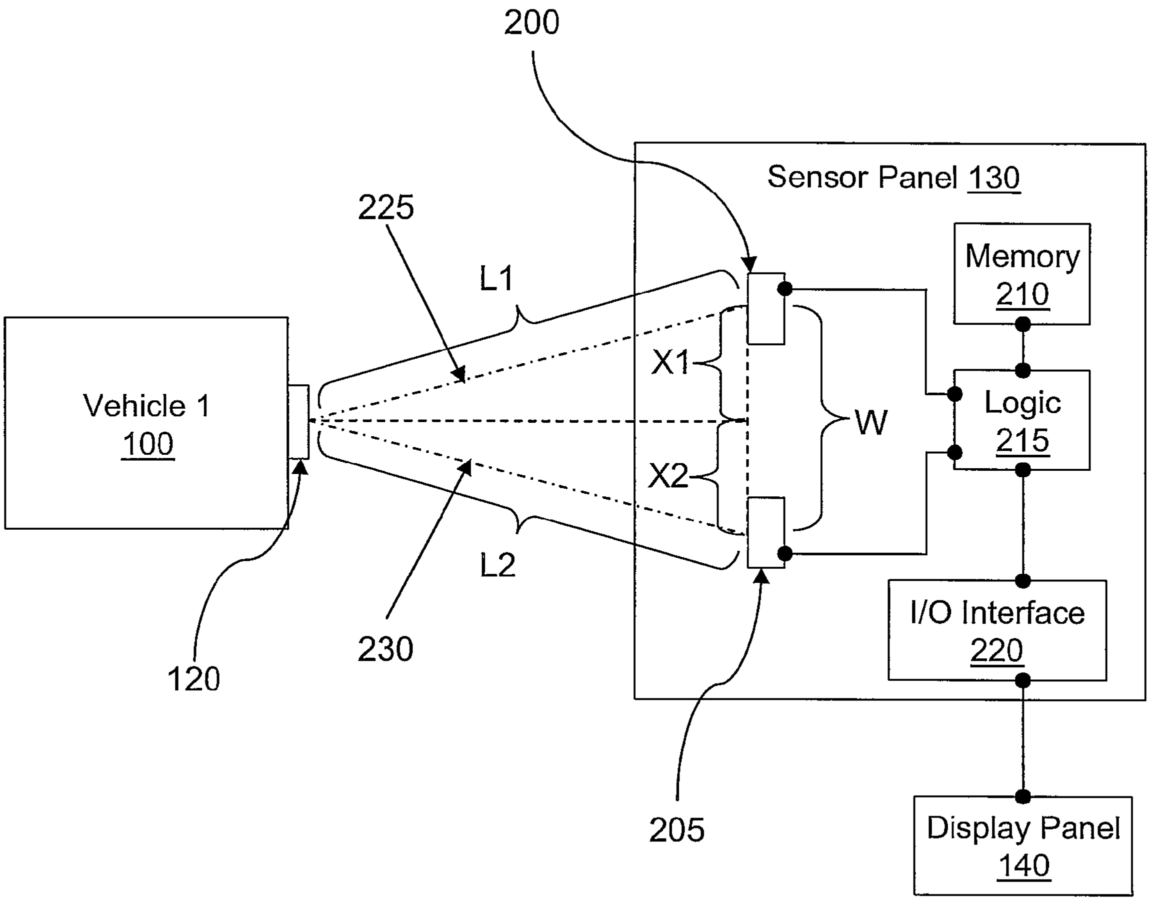
FIG. 2 illustrates a schematic diagram of the automated parking assistance system of FIG. 1 triangulating the position of a vehicle, according to an embodiment of the present invention.

With reference now to FIG. 2, there is depicted a schematic diagram of the automated parking assistance system of FIG. 1 triangulating the position of first vehicle 100, according to an embodiment of the present invention. As shown, first sensor panel 130 includes multiple ultrasonic sources 200 and 205, a logic unit 215, a memory 210 coupled to logic unit 215, and an input/output (I/O) interface 220 coupled to logic 215. I/O interface 220 enables logic 215 to receive input from set button 192 (from FIG. 1) and to send navigational output to guidance signals 150, 160, 170, and 180, and stop signal 190. In another embodiment, set button 192 may instead be located on first sensor panel 130 and/or coupled directly to logic 215.

Ultrasonic sources 200 and 205 are coupled to logic 215 and enable logic unit 215 to determine the position of a vehicle by triangulating the position of a transponder, such as transponder 120, which is attached to first vehicle 100. Ultrasonic source 200 emits ultrasonic energy 225, which travels a distance L1 at a known velocity to reach transponder 120. Subsequently, after a short delay (e.g., 100 msec), ultrasonic source 205 emits ultrasonic energy 230 which travels a distance L2 at a known velocity to reach transponder 120. In one embodiment, logic 215 calculates distances L1 and L2 by measuring the transit time required for echoes of sequential pulses of ultrasonic energy 225 and 230, respectively, to return to ultrasonic sources 200 and 205 after reaching transponder 120.

Ultrasonic sources 200 and 205 are located a distance W apart from each other. With first vehicle 100 located at any point, the lateral (i.e., left/right) position of first vehicle 100 is measured (i.e., projected onto a virtual line that includes ultrasonic sources 200 and 205) at a distance X1 from ultrasonic source 200 and a distance X2 from ultrasonic source 205. According to the illustrative embodiment of FIG. 2, distance W is defined by the following equation:

$$W = X1 + X2.$$

A geometric analysis based on the Pythagorean theorem, which is defined for a given triangle by the following formula:

$$(\text{First Side})^2 + (\text{Second Side})^2 = (\text{Hypotenuse})^2,$$

reveals that the triangles created by distances L1, L2, X1, and X2 are defined by the following equation:

$$(L1)^2 - (X1)^2 = (L2)^2 - (X2)^2.$$

The position of first vehicle 100 is therefore defined by the following basic triangulation equation:

$$(X1 - X2) = \{(L1 - L2) * (L1 + L2)\} / W.$$

The above equation is for the case where the point defined by X1 and X2 falls within the line segment defined by ultrasonic sources 200 and 205. It can be readily generalized for the case where the point defined by X1 and X2 falls outside the interval defined by ultrasonic sources 200 and 205.

According to the illustrative embodiment, multiple predefined parking spots are thus defined by different values of (X1−X2) and (L1+L2). In an alternate embodiment, logic 210 may determine the location of a vehicle by using a digital camera. In another embodiment, logic 210 may determine the location of a vehicle using a pattern recognition algorithm in addition to a digital camera.

Memory 210 stores one or more pre-defined parking spots (i.e., pre-defined values of (X1−X2) and (L1+L2) corresponding to each vehicle identification value). In one embodiment, memory 210 may include a database with index values corresponding to each vehicle identification value for which values of (X1−X2) and (L1+L2) have been defined and stored. Each time a new pre-defined parking spot is set for a vehicle, the previously stored parking spot for that vehicle is overwritten with the new values of (X1−X2) and (L1+L2) in memory 210. Memory 210 may be a flash memory, a random access memory (RAM), a hard disk drive, or the like.

Figure 3:
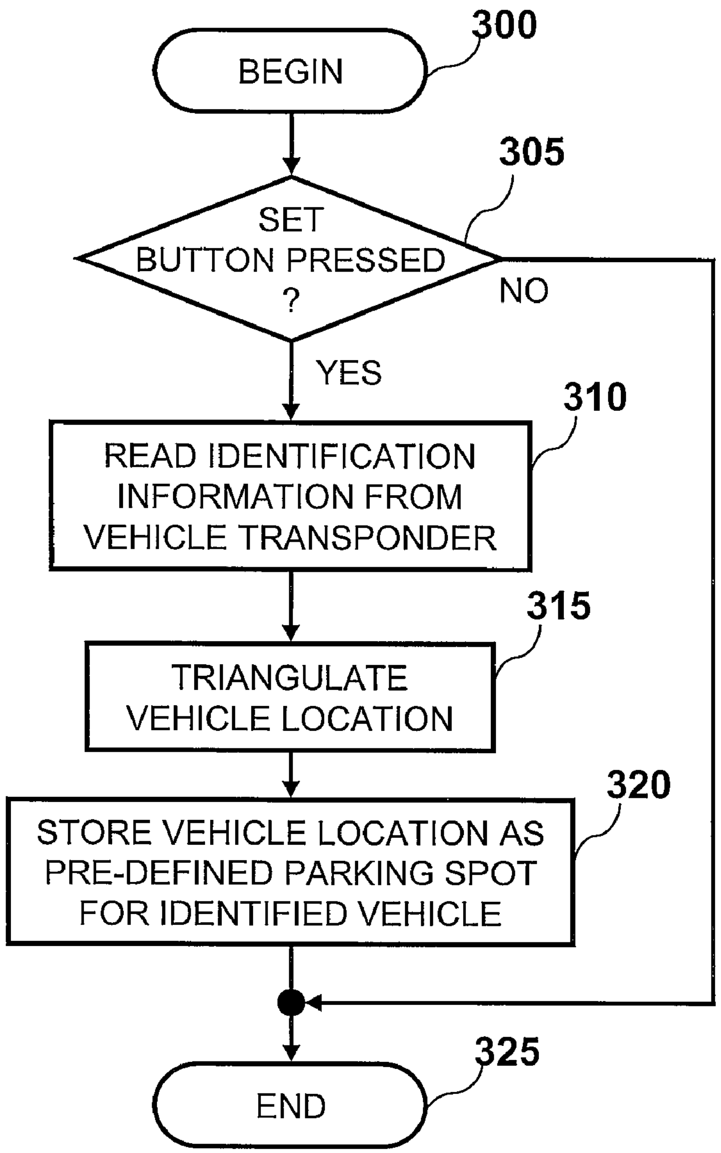
FIG. 3 is a high level logical flowchart of an exemplary method of defining a parking spot for a vehicle, according to an embodiment of the invention.

With reference now to FIG. 3, there is illustrated a high level logical flowchart of an exemplary method of defining a parking spot for a vehicle, according to an embodiment of the invention. The process begins at block 300 in response to a user of the automated parking assistance system placing a vehicle, such as first vehicle 100 (from FIG. 1), in a preferred parking position. At block 305, logic 215 (from FIG. 2) determines whether set button 192 has been pressed. If set button 192 has not been pressed, the process terminates at block 325. If set button 192 has been pressed, logic 215 utilizes ultrasonic sources 200 and 205 to read identification information from first transponder 120, as depicted in block 310. Logic 215 calculates values of (X1−X2) and (L1+L2) via the triangulation formula discussed above (i.e. measuring the transit time of sequential pulses from ultrasonic sources 200 and 205), as shown in block 315. Logic 215 stores the calculated values of (X1−X2) and (L1+L2) (i.e., the vehicle location) in memory 210 as a pre-defined parking spot, along with the identification information that corresponds to the vehicle, as depicted in block 320, and the process terminates at block 325.

Figure 4:
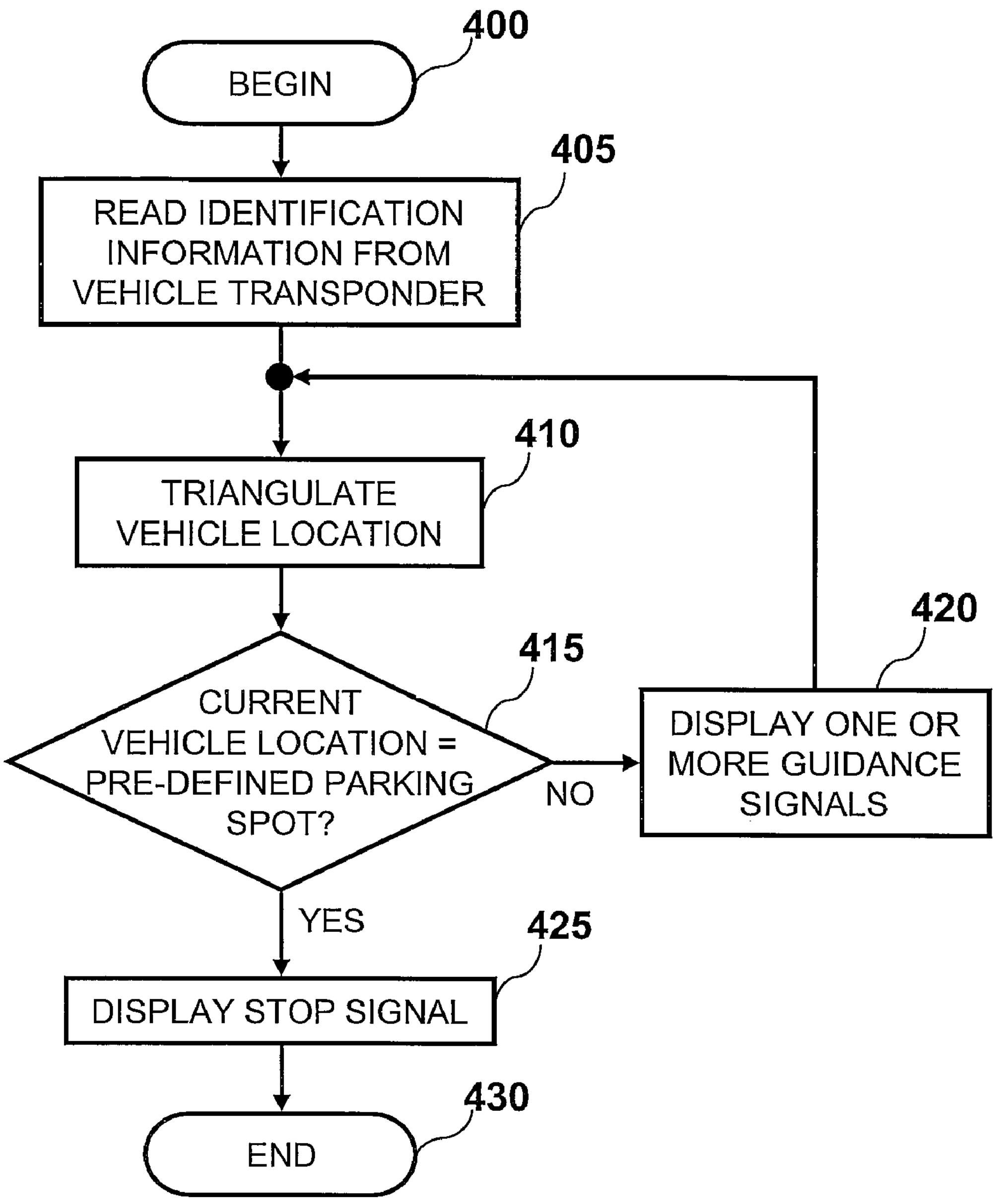
FIG. 4 is a high level logical flowchart of an exemplary method of guiding a vehicle to a pre-defined parking spot, according to an embodiment of the invention.

Turning now to FIG. 4, there is illustrated a high level logical flowchart of an exemplary method of guiding a vehicle to a pre-defined parking spot, according to an embodiment of the invention. The process begins at block 400 in response to a vehicle, such as first vehicle 100 (from FIG. 1), that is equipped with a transponder, such as first transponder 120, being detected initially approaching sensor panel 130. Logic 215 (from FIG. 2) utilizes ultrasonic sources 200 and 205 to read identification information from first transponder 120, as depicted in block 405. Logic 215 calculates values of (X1−X2) and (L1+L2) (i.e., the current vehicle location) via the triangulation formula discussed above (i.e. measuring the transit time of sequential pulses from ultrasonic sources 200 and 205), as shown in block 410. At block 415, logic 215 determines whether the current values of (X1−X2) and (L1+L2) are equal to the pre-defined values of values of (X1−X2) and (L1+L2) (i.e., whether first vehicle 100 is in first pre-defined parking spot 110). In another embodiment, logic 215 may utilize a pre-defined margin of error (i.e., an extended buffer zone) to determine whether first vehicle 100 is in first pre-defined parking spot 110.

If first vehicle 100 is not in first pre-defined parking spot 110, logic 215 displays one or more guidance signals on first display panel 140 that correspond to the direction first vehicle 100 will need to move in order to reach first pre-defined parking spot 110, as shown in block 420, and the process returns to block 410. For example, if first vehicle 100 is currently located behind and to the right of first pre-defined parking spot 110 (as shown in FIG. 1), logic 215 displays forward guidance signal 150 and left guidance signal 180 simultaneously. If first vehicle 100 is currently located in first pre-defined parking spot 110, logic 215 displays stop signal 190 on first display panel 140, as depicted in block 425, and the process terminates at block 430.

The present invention thus provides a method of automated parking assistance. Logic 215 (from FIG. 2) reads identification information from transponder 120 (from FIG. 1) attached to first vehicle 100 and determines the current position of first vehicle 100 by measuring distances between transponder 120 and multiple stationary sensor devices, such as ultrasonic sources 200 and 205. A first pre-defined parking spot 110 is stored by pressing a single set button 192. If the current position of first vehicle 100 is not equal to first pre-defined parking spot 110 when first vehicle 100 subsequently approaches, logic 215 determines one or more directions in which the current position of first vehicle 100 must be adjusted to reduce the distance between the current position of first vehicle 100 and pre-defined parking spot 110. First display panel 140 displays one or more guidance signals corresponding to the one or more directions in which the current position of first vehicle 100 must be adjusted. If the current position of first vehicle 100 is equal to pre-defined parking spot 110, stop signal 190 is displayed.

It is understood that the use herein of specific names are for example only and not meant to imply any limitations on the invention. The invention may thus be implemented with different nomenclature/terminology and associated functionality utilized to describe the above devices/utility, etc., without limitation.

While the invention has been particularly shown and described with reference to a preferred embodiment, it will be understood by those skilled in the art that various changes in form and detail may be made therein without departing from the spirit and scope of the invention.

What is claimed is:

1. A parking assistant system for use in conjunction with at least one transponder attached to a vehicle, said system comprising:

two stationary sensors mounted a known distance apart proximate to a particular parking space for measuring a distance between said at least one transponder and each of said two stationary sensors;

triangulation means for calculating a precise location of said at least one transponder utilizing said measured distances between said at least one transponder and each of said two stationary sensors;

comparison means for comparing said calculated precise location of said at least one transponder with a stored transponder location associated with a preferred parking location within said particular parking space for said vehicle;

indication means for displaying one or more guidance signals indicating a direction in which said vehicle's position should be adjusted to arrive at said preferred parking location within said particular parking space for said vehicle; and park indicator means for displaying a signal indicating that said calculated precise location of said at least one transponder is substantially equal to a preferred parking location within said particular parking space for said vehicle.

2. The parking assistance system according to claim 1, wherein said at least one transponder includes a radio frequency identification (RFID) tag which uniquely identifies said vehicle.

3. The parking assistance system according to claim 2, wherein each of said two stationary sensors comprises an ultrasonic source.

4. The parking assistance system according to claim 3, wherein said at least one transponder transmits a reply in response to detection of a burst of ultrasonic energy.

5. The parking assistance system according to claim 1, further including memory means for storing a preferred parking location for said vehicle.

6. The parking assistance system according to claim 5, further including selection means for storing within said memory means a current location of said vehicle designated as a preferred parking location, in response to a user input.

7. The parking assistance system according to claim 6, further including means for storing a unique identification of said vehicle in association with said preferred parking location, in response to said user input.

8. A method for precisely parking a vehicle having at least one transponder attached thereto, said method comprising:

periodically measuring a distance between said at least one transponder and two spaced apart stationary sensors associated with a particular parking space;

calculating a precise location of said at least one transponder utilizing said measured distances between said at least one transponder and said two spaced apart stationary sensors;

comparing said calculated precise location with a stored location associated with a preferred parking location within said particular parking space for said vehicle;

displaying one or more guidance signals indicating a direction in which said vehicle's position should be adjusted to arrive at said preferred parking location within said particular parking space for said vehicle in response to said comparison;

displaying a stop signal when said calculated precise location is substantially equal to said preferred parking location within said particular parking space for said vehicle.

9. The method according to claim 8, further including the step of storing a current position of said vehicle designated as a preferred parking location, in response to a user input.

10. The method according to claim 9, further including the step of storing identification information which corresponds to said at least one transponder in association with said preferred parking location.

* * * * *